United States Patent [19]
Fetzek

[11] 3,899,982
[45] Aug. 19, 1975

[54] PULL OUT TABLE FOR ATTACHMENT BENEATH AN AUTOMOBILE DASHBOARD
[76] Inventor: Richard J. Fetzek, 2615-B Magnolia Ln., Minneapolis, Minn. 55441
[22] Filed: Jan. 28, 1974
[21] Appl. No.: 437,751

[52] U.S. Cl. .................. 108/25; 108/45; 108/93; 108/143; 312/242; 312/246; 312/335
[51] Int. Cl.² .......................................... A47B 37/00
[58] Field of Search .......... 108/42, 44, 45, 93, 137, 108/143, 25; 312/242, 246, 334, 335, 338, 345

[56] References Cited
UNITED STATES PATENTS
| 2,435,151 | 1/1948 | Morgan | 108/45 X |
| 2,745,705 | 5/1956 | Morgan | 108/45 |
| 3,606,112 | 9/1971 | Cheshier | 108/45 X |

FOREIGN PATENTS OR APPLICATIONS
| 278,032 | 1/1914 | Germany | 108/93 |
| 135,488 | 11/1933 | Austria | 312/334 |

Primary Examiner—Roy D. Frazier
Assistant Examiner—William E. Lyddane

[57] ABSTRACT

A table adapted to be mounted beneath the dashboard of an automobile and which is movable between a retracted position beneath the dashboard and telescopic position projecting outwardly in front of the dashboard in a position ready for use, the table comprised of a supporting bracket secured to the dashboard, a table holder mounted in the supporting bracket for reciprocal movement relative thereto, and a table mounted in the table holder for reciprocal movement relative thereto such that maximum extension of the table from the dashboard is provided while affording a compact telescopic retractability of the table beneath the dashboard.

9 Claims, 4 Drawing Figures

PULL OUT TABLE FOR ATTACHMENT BENEATH AN AUTOMOBILE DASHBOARD

BACKGROUND OF THE INVENTION

1. Field of the Invention

This invention relates generally to tables and more particularly to a novel pull out and retractable table adapted for attachment beneath an automobile dashboard.

2. Description of the Prior Art

Many individuals patronize drive-in restaurants and theaters where they are served food and drinks in the car but with the same being quite inconvenient in that the serving tray brought to the car by the attendant is normally positioned on the window adjacent one of the individuals in the car such that the tray and the food thereon is only convenient to the individual sitting at the particular window.

Further, many individuals at times require a table or other writing surface in the automobile, such as salesmen making notes or the like, with such individuals presently having to use makeshift arrangements to perform such writing.

In view of these needs the prior art does disclose tables for use in automobiles and which are in some manner attached to the dashboard of the automobile and capable of retractability therebeneath, however most of such prior art devices are designed for arrangement to sit on the vehicle floor or otherwise equipped for suspension on a door of the vehicle or other part of the vehicle such that when they are not in use they must be stored in some other portion of the vehicle in which space is generally at a premium. Further, such devices can create a nuisance for passengers and, in some instances, a hazard to the proper control of the automobile.

As to those tables which are designed for retraction beneath the automobile dashboard, while they are generally more desirable since less space is required for the storage thereof, they also suffer from many disadvantages in that due to the limited amount of space normally available beneath the dashboard of modern automobiles such retractable tables lack sufficient surface area so that when extended for use they are not adequate for the normal requirements either for use as a table or for supporting food thereon in a convenient manner for the occupants of the automobile.

SUMMARY OF THE INVENTION

The present invention recognizes the advantages of providing a retractable table adapted for mounting beneath a vehicle dashboard and, recognizing the deficiencies and disadvantages of presently available retractable tables, provides a novel solution thereto wherein the table is provided with a maximum extension and surface area while still affording compact retractability in a telescopic manner of the table beneath the dashboard.

It is a feature of the present invention to provide a table adapted for attachment to an automobile dashboard and which is adapted to be retracted therebeneath in a compact storage position.

A further feature of the present invention provides a table mounted beneath a vehicle dashboard and which may be readily pulled out to an extended position for usage thereof and which may be readily pushed back for a storage position thereof.

Among the features and advantages of the present invention is the provision of a pull out table adapted for attachment beneath an automobile dashboard and which is relatively simple in its construction and which therefore may be readily manufactured at a relatively low cost and by simple manufacturing methods; one which is possessed of few parts and which therefore is unlikely to get out of order; one which is of a rugged and durable construction and which therefore may be guaranteed by the manufacturer to withstand many years of intended usage; one which is easy to use and reliable and efficient in operation; one which is aesthetically pleasing and refined in appearance; one which may, in its entirety, by manufactured and installed as part of the original equipment of the automobile, or which may be readily attached to the automobile later as an accessory item; and one which is otherwise well adapted to perform the services required of it.

Other features and advantages of this invention will be apparent during the course of the following description.

BRIEF DESCRIPTION OF THE DRAWINGS

In the accompanying drawings forming a part of this specification and in which like reference characters are employed to designate like parts throughout the same.

DESCRIPTION OF THE PREFERRED EMBODIMENT

Figure 1:
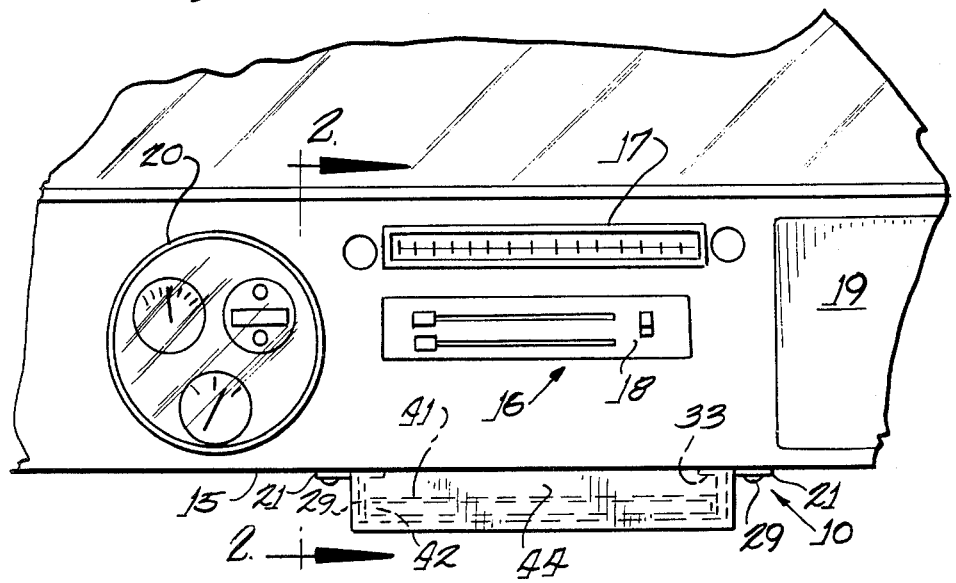
FIG. 1 is a front elevational view of a typical automobile dashboard having the table of the present invention mounted therebeneath.
Figure 2:
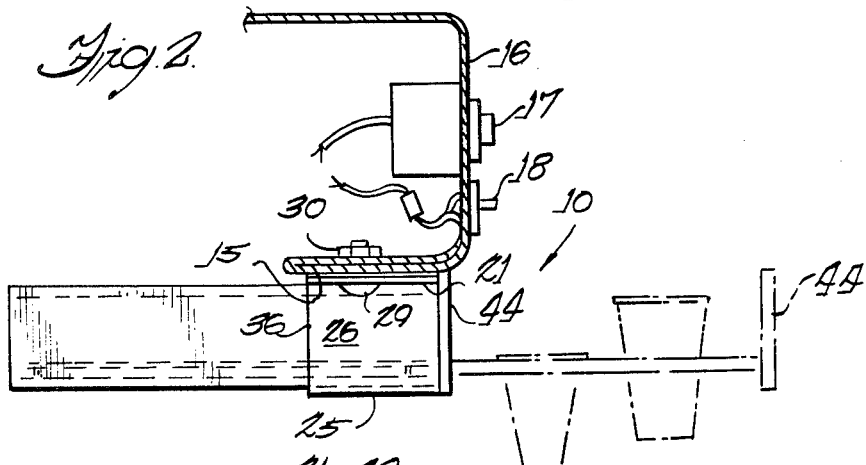
FIG. 2 is a cross-sectional view taken along Line 2—2 of FIG. 1.

Referring now to the drawings in detail there is illustrated a preferred form of a pull out table adapted for attachment beneath an automobile dashboard and which is constructed in accordance with the principles of the present invention and which is designated generally in its entirety by the reference numeral 10 and which is comprised of a supporting bracket 11, a table holder 12 reciprocally mounted in the supporting bracket for sliding movement relative thereto, and a table member 13 which is slidably mounted in table holder 12 for reciprocal sliding movement relative thereto. As seen in the drawings the device 10 is mounted to the underside 15 of a conventional automobile dashboard 16 containing a radio 17, ventilating controls 18, glove compartment 19, and a cluster of normally provided instruments 20.

The supporting bracket 11 is comprised of a substantially flat rectangularly shaped base member 21 having an exterior surface 22 and an interior surface 23 with there being mounted to the interior surface in confronting relationship therewith a U-shaped hanger member 24 having a bottom surface 25 and side wall surfaces 26 which project upwardly therefrom and are joined to the interior surface 23 by winged portions 27 formed integrally therewith and extending longitudinally outwardly therefrom in opposite directions. Mounting apertures 28 are provided in opposite ends of the base member 21 and wing portions 27 and are adapted to receive therethrough associated bolts 29 which pass through openings provided in the bottom surface 15 of dashboard 16 and which are secured thereto by associated nuts 30.

The table holder 12 is comprised of a substantially flat rectangularly shaped bottom surface 31 having vertically extending side walls 32 projecting upwardly therefrom with each terminating in an inwardly directed flange 33 extending therealong and inwardly depending therefrom substantially parallel to the bottom surface 31. The bottom surface 31 is of a width adapted to be received in support bracket 11 intermediate side walls 26 with bottom surface 31 resting on bottom surface member 25 of the support bracket, and the table holder side walls 32 projecting upwardly a distance slightly less than the height of support bracket walls 26. Provided on the back edge 34 of each of table holder side walls 32 are outwardly projecting stop members 35 which are movably connected to the back edge for movement between an inoperative position disposed inwardly of the plane of the side wall surface and an operative position projecting outwardly of the side wall surface and adapted to engage the back edge surface 36 of support bracket side walls 26 to limit the forward projection of table holder outwardly of the supporting bracket. The table holder bottom surface 31 is provided with a semi-circular recess 37 in the front edge 38 thereof, and is further provided with a pair of transversely spaced apart vertically upwardly projecting stop members 39 spaced slightly inwardly of the front edge 38 and which may be formed as tangs punched out of the material of the bottom surface and bent upwardly into the upright position.

The table 13 is comprised of a substantially flat rectangularly shaped platform 41 having downwardly projecting side rails or side walls 42 at each side thereof and further having a back edge 43 and a front edge formed integrally with a transversely extending vertically disposed decorative front panel 44. The width of platform 41 is slightly less than the interior width of table holder bottom surface 31 such that the platform is slidingly received in the table holder with side rails 42 riding along the bottom surface 31 adjacent the interior of side walls 32 with the platform being slidable reciprocally in a telescopic manner into and out of the table holder 12. The platform 41 is provided with a pair of transversely spaced apart downwardly projecting stop members 45 disposed slightly inwardly from back edge 43 and located in positions on the platform to engage with stop members 39 of table holder 12 in a manner to limit the forward telescopic movement of table 13 outwardly of table holder 12. Further, the platform 41 may be provided with one or more circular openings such as designated by reference numeral 46 and which are adapted to receive beverage cup holders or the like therein such as when the table is being used for holding food and drinks in a convenient manner for the occupants of the automobile. However, it is to be understood that the provision of openings 46 is optional, and that the platform 41 may be left as a smooth surface for ease in writing thereon. Still further it is to be understood that stops 45 may be formed by being punched out as tangs from the material of the platform 41 and then bent downwardly out of the plane of the platform in a manner to engage with the tang stop members 39 of table holder 12.

Figure 3:
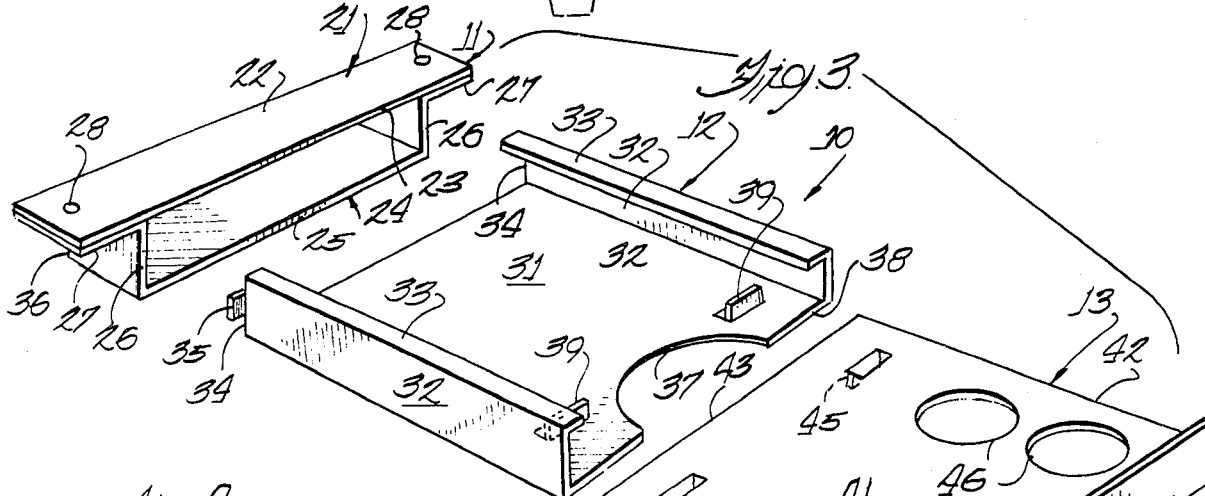
FIG. 3 is an exploded perspective view of the table of the present invention.
Figure 4:
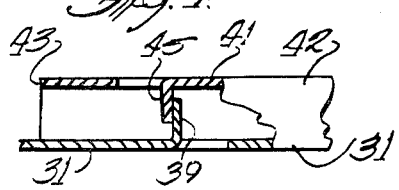
FIG. 4 is an enlarged fragmentary cross-sectional view showing the engagement of the downward extending stops of the table with the upward extending stops of the table holder.

The operation is apparent from viewing FIG. 3 in that supporting bracket 11 is mounted by bolts 29 to the bottom surface 15 of dashboard 16, table holder 12 is slid into the supporting bracket after which stop members 35 are moved to their operative projecting position to prevent the table holder from being withdrawn out of the supporting bracket thus limiting the forward projection of the table holder relative to the supporting bracket, after which table 13 is inserted into the table holder with stops 45 passing over table holder stops 39 when the table is initially inserted into the table holder, after which the bottom edges of rails or side walls 42 of the table ride along the top surface of table holder bottom surface 31 with table stops 45 engaging table holder stops 39 to limit the maximum forward projection of the table relative to the table holder. It is thus seen that upon an individual gripping panel 44 and pulling table 13 outwardly from the dashboard that the table will telescope out of table holder 12 until stops 45 engage stops 39, after which the interengagement of the stops will effect the telescopic outward movement of the table holder 12 relative to the supporting bracket 11 until stops 35 engage the back edges 36 of the supporting bracket, this being the maximum fully extended position of the table device 10. To retract the table beneath the dashboard 15 it is only necessary that an individual push panel 44 in the direction of the dashboard which effects the telescopic retraction of the table into the table holder and the table holder into the supporting bracket until the table is completely retracted beneath the dashboard.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A pull out table adapted for attachment beneath the dashboard of an automobile and movable between a retracted position disposed beneath the dashboard and an extended position projecting outwardly of the dashboard into the passenger compartment for convenient use thereof by occupants of the automobile, the apparatus comprising:

a supporting bracket adapted to be attached to the undersurface of said dashboard in a manner extending transversely of said vehicle, said supporting bracket having a rectangularly shaped compartment defined therein and open at the front and back ends thereof;

a table holder including a substantially flat rectangularly shaped bottom surface, vertically extending side wall surfaces disposed along each side edge of said bottom surface, and an inwardly directed flange formed integrally with the top edge of each bottom surface side wall surface and extending outwardly therefrom in confronting relationship in a manner substantially parallel to the plane of said bottom surface, said table holder having a back edge and a front edge, said bottom surface and said side wall surfaces of said table holder being of a size and configuration adapted to be slidingly received in said supporting bracket compartment for reciprocal sliding movement relative thereto;

means operatively associated with said table holder to limit the forward movement of said table holder relative to said supporting bracket;

a table member comprised of a substantially flat rectangularly shaped platform having a pair of downwardly projecting side rails disposed along opposite side edges thereof, said platform having a back edge and a front edge, said table adapted to be slidingly inserted and received in said table holder with said platform overlying said table holder bottom surface and with said platform side rails in juxtaposition with adjacent table holder side wall surfaces with the bottom edges of said side rails in sliding engagement with the top surface of said table holder bottom surface whereby said table is reciprocally slidable in a telescopic manner from a position overlying said table holder bottom surface to a position projecting forwardly thereof; and means on said table holder and cooperating means on said platform operative to limit the forwardmost projection of said table relative to said table holder.

2. The apparatus as set forth in claim 1 wherein said supporting bracket is comprised of a substantially flat elongated rectangularly shaped base member having an exterior surface adapted to be placed in juxtaposition with the bottom surface of said dashboard and having an interior surface projecting in the opposite direction from said exterior surface, a generally U-shaped hanger member having a bottom base portion spaced outwardly from said base member interior surface and having leg portions defining side walls projecting therefrom to be joined to said base member interior surface adjacent opposite ends thereof, said supporting bracket compartment being defined between said hanger member and said base member, a mounting opening provided in each end of said base member and adapted to receive suitable fastening means therethrough for affixing said supporting bracket to said dashboard.

3. The apparatus as set forth in claim 2 wherein said means limiting the forward projection of said table holder relative to said supporting bracket comprises a pair of just stop members, each stop member associated with the back edge of one of said table holder side wall surfaces and adapted to project outwardly therefrom in a manner to engage a back edge surface of said supporting bracket hanger member side wall members when said table holder is telescopically projected outwardly therefrom so as to limit the projection thereof.

4. The apparatus as set forth in claim 3 wherein said means affixed to said table holder and said table for limiting the forward projection of said table relative to said table holder is comprised of a pair of transversely spaced apart upwardly extending second stop members provided on the top surface of said table holder bottom surface and spaced a short distance inwardly from said front edge thereof, and a pair of transversely spaced apart downwardly projecting third stop members affixed to said table platform and projecting downwardly therefrom in positions in alignment with said table holder stop members when said table is telescopically received in said table holder whereby engagement of said second and third members limits the forward projection of said table relative to said table holder.

5. The apparatus as set forth in claim 1 further comprising a semi-circular recess formed in the front edge of said table holder bottom surface and providing freedom of access therethrough for the gripping of said table for pulling or pushing said table relative to said table holder.

6. The apparatus as set forth in claim 5 wherein said platform is further comprised of a pair of beverage cup receiving openings extending therethrough.

7. The apparatus set forth in claim 1 further comprising decorative panel means fixed to said front edge of said platform.

8. The apparatus set forth in claim 1 wherein said limiting means on said table holder comprises at least one tang extending upwardly from the bottom surface thereof, and said limiting means on said table member comprises at least one tang extending downwardly from its said platform.

9. The apparatus as set forth in claim 8 in which said supporting means comprises a bracket having top, side and bottom walls forming said rectangular opening providing front and back edges for said rectangular opening, said means to limit the forward movement of said table holder comprising at least one outwardly projecting stop member on said table holder engageable with the rear edge of one of said bracket side walls.

* * * * *